United States Patent [19]

Kurahashi et al.

[11] 4,110,070

[45] Aug. 29, 1978

[54] HEAT TRANSFER PRINTING ON ACIDIC MODIFIED SYNTHETIC FIBER

[75] Inventors: Takeo Kurahashi; Shigeo Maeda; Sanai Seki; Nobuo Suzuki; Takayuki Sakai, all of Tokyo, Japan

[73] Assignee: Hodogaya Chemical Co., Ltd., Tokyo, Japan

[21] Appl. No.: 775,562

[22] Filed: Mar. 8, 1977

[30] Foreign Application Priority Data

Mar. 17, 1976 [JP] Japan ................................ 51-28193
May 24, 1976 [JP] Japan ................................ 51-59067
Jun. 11, 1976 [JP] Japan ................................ 51-67767

[51] Int. Cl.$^2$ .......................... D06P 1/38; D06P 3/10; D06P 3/52

[52] U.S. Cl. .......................................... 8/2.5 R; 8/1 B; 8/1 D; 8/62; 8/168 R; 8/168 CA

[58] Field of Search ................. 8/2.5 A, 2.5 R, 1 B, 8/1 D, 168 CA, 168 R, 62

[56] References Cited

U.S. PATENT DOCUMENTS 3,992,140  11/1976  Psaar ...................... 8/2.5 A
3,999,939  12/1976  Psaar ...................... 8/2.5 A

*Primary Examiner*—John Kight, III
*Attorney, Agent, or Firm*—Oblon, Fisher, Spivak, McClelland & Maier

[57] ABSTRACT

A heat transfer printing is carried out by quaternizing an indolenine methine compound with acidic groups of an acidic modified synthetic fiber.

6 Claims, No Drawings

HEAT TRANSFER PRINTING ON ACIDIC MODIFIED SYNTHETIC FIBER

BACKGROUND OF THE INVENTION

1. Field of the Invention

The present invention relates to a heat transfer printing on an acidic modified synthetic fiber using an ink composition containing an indolenine methine compound to form a dye by quaternizing the indolenine methine compound with acidic groups of the acidic modified synthetic fiber.

2. Description of the Prior Art

The transfer printing techniques have been remarkably developed in these several years. Especially the transfer printing by sublimation of dyes has been developed because of the labour reduction in the dyeing process and the social requirement for preventing pollution. In the polyester fiber field, the transfer printing techniques have been employed at a ratio of 10 to 15%.

The reasons why the transfer printing techniques have been considered in the world-wide and have been applied in various fields, are to easily obtain printed textiles and to eliminate the soaping and water washing as the post-treatment for the dyeing process whereby the treatment of drainage which is the most important problem in a dyeing factory can be remarkably rationalized.

In the circumstance, the heat transfer printing on polyester fiber by using dispersing dyes has been employed in an industrial scale. However, the heat transfer printing on the acryl type fiber by using cationic dyes has not been practically employed because the cationic dyes have low sublimation transfer printability and the fastness of the textile dyed by the sublimation transfer printability is inferior to that of the textile dyed by the conventional process.

However, various techniques for applications on acryl type fiber have been proposed. For example, in order to improve the transfer printability of cation dyes, it has been proposed to provide a transfer printing under a reduced pressure and a transfer printing of free base type dyes. However, in the former method, the apparatus and the dyes are substantially limited. On the other hand, in the latter method, the free base type dyes are instable to be difficult for blending the dyes in the ink composition for transfer printing and the stability of the transfer printing paper prepared with such ink composition containing the free base type dye is not satisfactory.

SUMMARY OF THE INVENTION

It is an object of the present invention to provide heat transfer printing which imparts bright deep colour and high light-fastness on acidic modified synthetic fiber especially acidic modified acryl type fiber, acidic modified polyester fiber or acidic modified polyamide fiber.

The object of the present invention has been attained by quaternizing an indolenine methine compound with acidic groups of the acidic modified synthetic fiber.

DETAILED DESCRIPTION OF THE PREFERRED EMBODIMENTS

The indolenine methine compounds used in the present invention have the formula

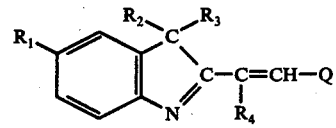

wherein $R_1$ represents hydrogen atom, a halogen atom, a $C_1 - C_3$ lower alkyl group or a $C_1 - C_3$ lower alkoxy group; $R_2$ and $R_3$ are the same or different and respectively represents a $C_1 - C_3$ lower alkyl group; $R_4$ represents hydrogen atom; methyl or cyano group; and Q represents the formula (2);

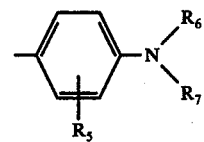

wherein $R_5$ represents hydrogen atom, a halogen atom, a $C_1 - C_3$ lower alkyl group or a $C_1 - C_3$ lower alkoxy group; $R_6$ and $R_7$ respectively represent a $C_1 - C_4$ lower alkyl group (including substituted alkyl groups having non-dissociated substituent), a phenyl or aralkyl group; or the formulae (3), (4) or (5);

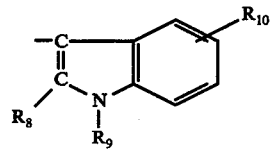

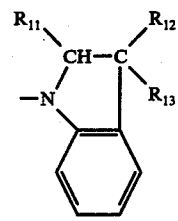

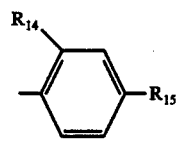

wherein $R_8$ represents a $C_1 - C_3$ lower alkyl group or phenyl group;

$R_9$ represents hydrogen atom or a $C_1 - C_3$ lower alkyl group;

$R_{10}$ represents hydrogen atom or non-dissociated substituent;

$R_{11}$, $R_{12}$ and $R_{13}$ respectively represent hydrogen atom or a $C_1 - C_3$ lower alkyl group;

$R_{14}$ and $R_{15}$ respectively represent hydrogen atom or a $C_1 - C_3$ lower alkyl group or a $C_1 - C_3$ lower alkoxy group or the formula (6);

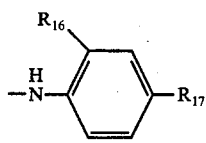
(6)

wherein $R_{16}$ represents hydrogen atom, a halogen atom, a $C_1$ - $C_3$ lower alkyl group or a $C_1$ - $C_3$ lower alkoxy group;

$R_{17}$ represents hydrogen atom, a $C_1$ - $C_3$ lower alkyl group, a $C_1$ - $C_3$ lower alkoxy group; or the formula (7);

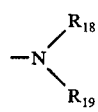
(7)

wherein $R_{18}$ represents hydrogen atom, a $C_1$ - $C_3$ lower alkyl group (including substituted alkyl group having non-dissociated substituent;)

$R_{19}$ represents a $C_1$ - $C_3$ lower alkyl group (including alkyl group having non-dissociated substituent); phenyl or aralkyl group; or the formulae (8), (9), (10), (11), or (12);

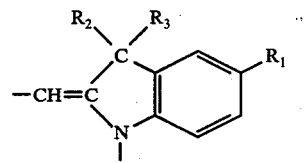
(8)

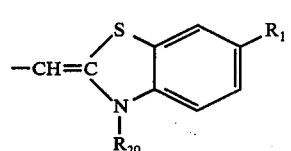
(9)

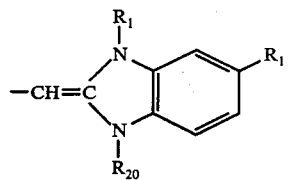
(10)

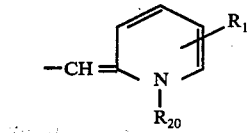
(11)

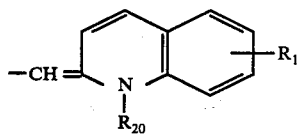
(12)

wherein $R_{20}$ and $R_{21}$ respectively represents a $C_1$ - $C_3$ lower alkyl group; $R_1$, $R_2$ and $R_3$ are defined above.

The dyeing mechanism between the indolenine methine compound (formula 1) and the acidic modified synthetic fiber is considered to result the quaternization of the tertiary nitrogen atom of formula (1) with the acidic group of the acid modified synthetic fiber.

The mechanism is schematically shown as follows:

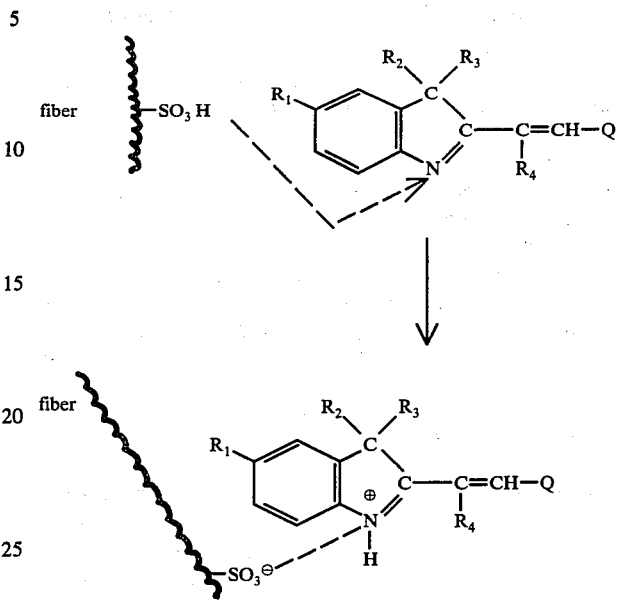

The indolenine methine compounds having the formula (1) can be converted to cationic dyes with the acidic groups of the acidic modified synthetic fiber by the transfer printing.

The fact is confirmed that the hues of the dyed textile are quite deeper and have superior brightness in comparison with those of the indolenine methine compounds before the transfer printing.

The phenomenone converting the indolenine methine compounds to the cationic dyes has not been found in the other heterocyclic disperse dyes having tertiary nitrogen atom. This is the special feature of the invention.

In the invention, the transfer printing can be carried out by using a disperse dye type compound. This fact is the other special feature of the invention to improve the disadvantage of inferior transfer printability by using the conventional cationic dyes.

The indolenine methine compounds having the formula (1) can be produced by the following processes.

(1) The indolenine methine compound (1) is produced by reacting an indolenine derivative having the formula

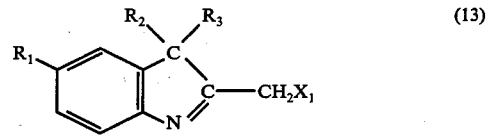
(13)

wherein $R_1$, $R_2$, $R_3$ and $X_1$ are defined above with a formyl compound having the formulae

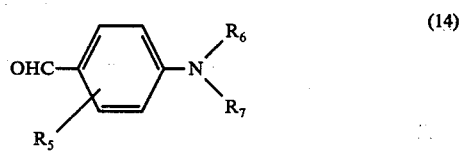
(14)

-continued

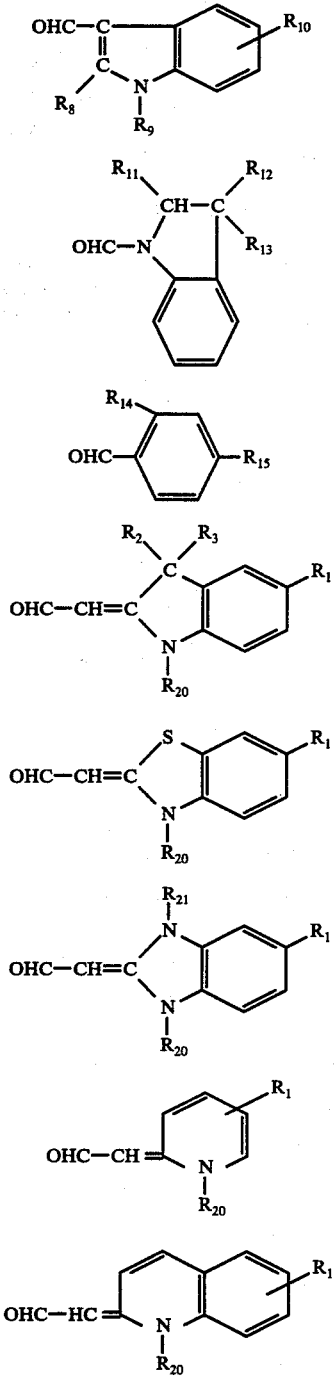

wherein $R_6$, $R_7$, $R_8$, $R_9$, $R_{10}$, $R_{11}$, $R_{12}$, $R_{13}$, $R_{14}$, $R_{15}$, $R_{20}$ and $R_{21}$ are defined above; in an acidic medium such as acetic acid or 20% sulfuric acid under heating.

(2) The indolenine methine compound (1) is also produced by reacting an indolenine derivative having the formula;

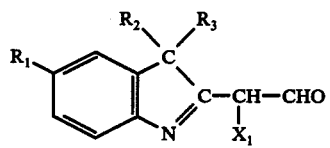

wherein $R_1$, $R_2$, $R_3$ and $X_1$ are defined above, with a compound having the formulae

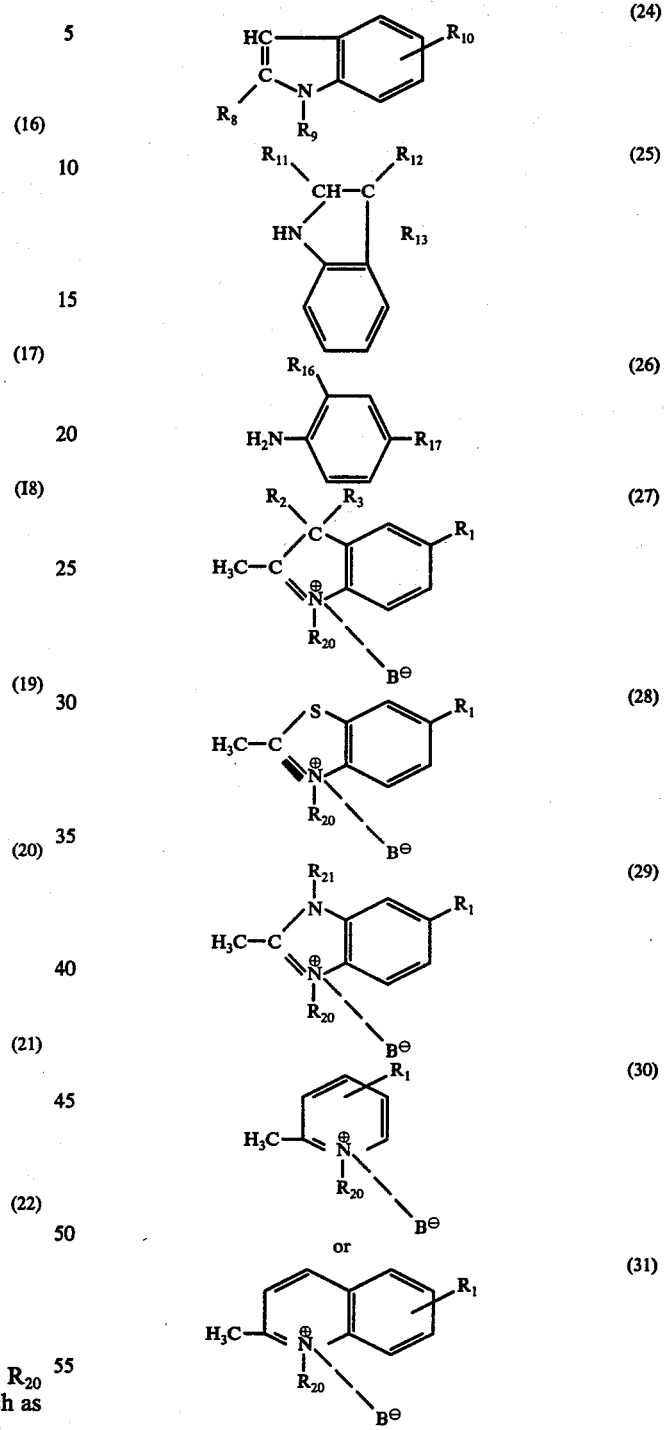

wherein $R_8$, $R_9$, $R_{10}$, $R_{11}$, $R_{12}$, $R_{13}$, $R_{16}$, $R_{17}$, $R_{20}$ and $R_{21}$ are defined above and $B^\ominus$ represents an anion of an inorganic acid in an acidic medium such as acetic acid or 20% sulfuric acid under heating.

It is possible to use a free base of the heterocyclic compound having the formulae (27) to (31) instead of the heterocyclic compound itself in the condensation.

Suitable indolenine derivatives having the formula (13) include 2,3,3-trimethylindolenine, 2,3,3,5-tetramethylindolenine, 2,3,3-trimethyl-5-propylindolenine, 2,3,3-trimethyl-5-ethylindolenine, 2,3,3-trimethyl-5-methoxyindolenine, 2,3,3,-trimethyl-5-ethoxyindolenine, 2,3,3-trimethyl-5-chloroindolenine, 2,3,3-trimethyl-5-bromoindolenine, 2,3-dimethyl-3-ethylindolenine, 2-ethyl-3,3-dimethylindolenine, 2-methyl-3,3-diethylindolenine and 2-cyanomethyl-3,3-dimethylindolenine, etc.

Suitable formyl anilines having the formula (14) include 4-formyl-N,N-dimethylaniline, 4-formyl-N,N-diethylaniline, 4-formyl-N-methyl-N-(β-cyanoethyl) aniline, 4-formyl-N-methyl-N-(β-chloroethyl) aniline, 4-formyl-N-methyl-N-(β-methoxyethyl) aniline, 4-formyl-N-(β-ethoxyethyl) aniline, 4-formyl-N-ethyl-N-(β-cyanoethyl) aniline, 4-formyl-N-ethyl-N-(β-chloroethyl) aniline, 4-formyl-N-ethyl-N-(β-methoxyethyl) aniline, 4-formyl-N-ethyl-N-(β-ethoxyethyl) aniline, 4-formyl-N-methyl-N-benzylaniline, 4-formyl-N-ethyl-N-benzylaniline, 4-formyl-N-(β-cyanoethyl)-N-benzylaniline, 4-formyl-N-(β-chloroethyl)-N-benzylaniline, 4-formyl-N-(β-methoxyethyl)-N-benzylaniline, 4-formyl-N-methyl-N-(4'-chlorobenzyl) aniline, 4-formyl-N-ethyl-N-(4'-methylbenzyl) aniline, 4-formyl-N,N-dimethyl-m-toluidine, 4-formyl-N,N-diethyl-m-toluidine, 4-formyl-N-methyl-N-(β-cyanoethyl)-m-toluidine, 4-formyl-N-methyl-N-(β-methoxyethyl)-m-toluidine, 4-formyl-N-ethyl-N-(β-chloroethyl)-m-toluidine, 4-formyl-N-ethyl-N-(β-ethoxyethyl)-m-toluidine, 4-formyl-N-ethyl-N-(β-cyanoethyl)-m-toluidine, 4-formyl-N-methyl-N-benzyl-m-toluidine, 4-formyl-N-ethyl-N-benzyl-m-toluidine, 4-formyl-N-(β-cyanoethyl)-N-benzyl-m-toluidine, 4-formyl-N-(β-chloroethyl)-N-benzyl-m-toluidine, 4-formyl-N-(β-methoxyethyl)-N-benzyl-m-toluidine, 4-formyl-N,N-diethyl-m-anisidine, 4-formyl-N,N-diethyl-m-chloroaniline, 4-formyl-N-methyldiphenylamine, and 4-formyl-N-ethyldiphenylamine.

Suitable formyl indole derivatives having the formula (15) include
2-methyl-3-formylindole, 2-ethyl-3-formylindole, 2-phenyl-3-formylindole, 1-methyl-2-phenyl-3-formylindole, 1-ethyl-2-phenyl-3-formylindole, 1,2-dimethyl-3-formylindole, 1,2-diethyl-3-formylindole, 1,5-dimethyl-2-phenyl-3-formylindole, 2-methyl-3-formyl-5-methoxyindole, 2-phenyl-3-formyl-5-chloroindole and 1,2,5-trimethyl-3-formylindole.

Suitable formyl indoline derivatives having the formula (16) include
1-formyl-2-methylindoline, 1-formyl-2-ethylindoline and 1-formyl-2,3,3-trimethylindoline, etc.

Suitable formyl benzaldehyde derivatives having the formula (17) include
2,4-dimethoxybenzaldehyde, 2,4-dimethylbenzaldehyde, 4-methoxybenzaldehyde, 4-methylbenzaldehyde, 4-propoxybenzaldehyde and 4-ethoxybenzaldehyde.

Suitable heterocyclic compounds having the formulae (18), (19), (20) and (21) include the compounds having the following formula

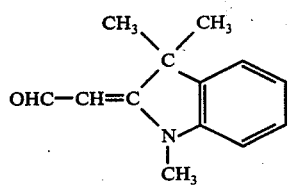
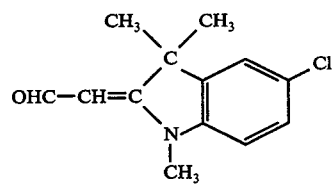
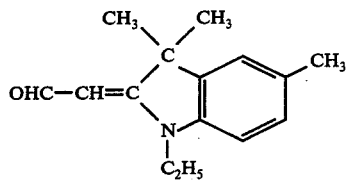
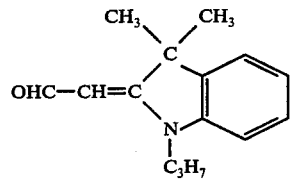
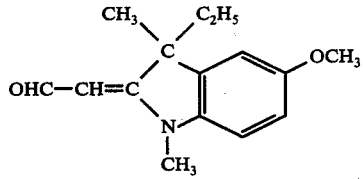
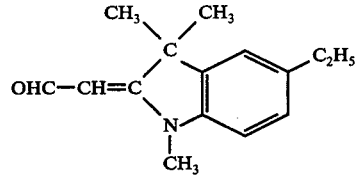
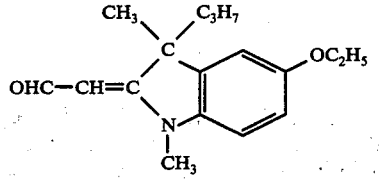
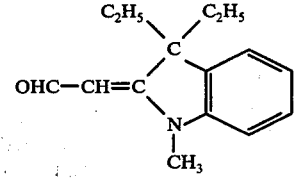
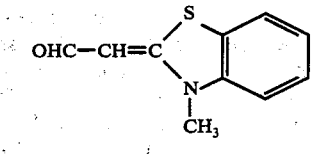
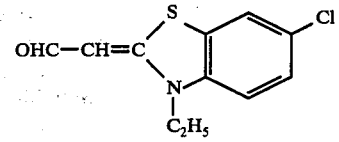

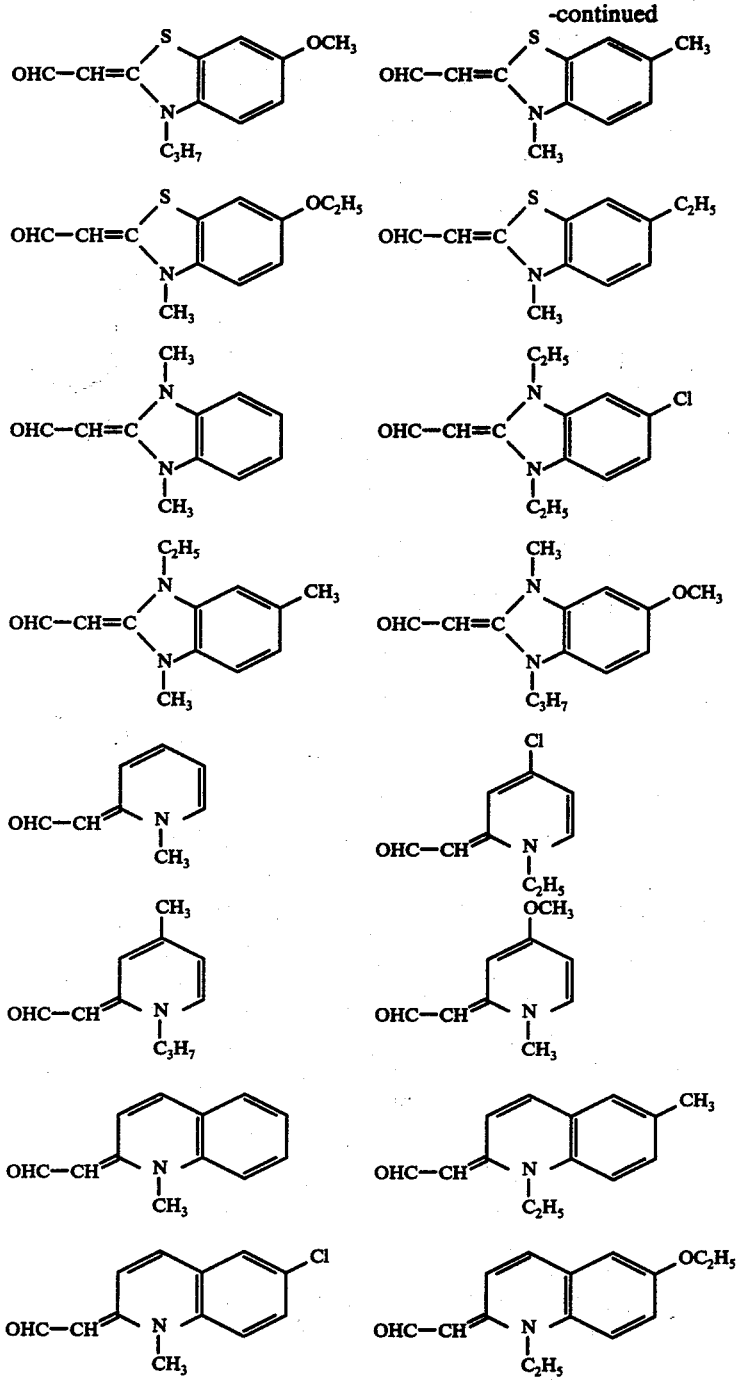

Suitable formyl indolenine derivatives having the formula (23) include 2-formylmethyl-3,3-dimethylindolenine, 2-formylmethyl-3,3,5-trimethylindolenine, 2-formylmethyl-3,3-dimethyl-5-propylindolenine, 2-formylmethyl-3,3-dimethyl-5-ethylindolenine, 2-formylethyl-3,3-dimethyl-5-methoxyindolenine, 2-formylmethyl-3,3-dimethyl-5-ethoxyindolenine, 2-formylmethyl-3,3-dimethyl-5-chloroindolenine, 2-formylmethyl-3,3-dimethyl-5-bromoindolenine, 2-formylmethyl-3-methyl-3-ethylindolenine, 2-(α-formylethyl)-3,3-dimethylindolenine, 2-formylmethyl-3,3-diethylindolenine and 2-formyl-cyanomethyl-3,3-dimethylindolenine, etc.

Suitable indole derivatives having the formula (24) include 2-methylindole, 2-ethylindole, 2-phenylindole, 1-methyl-2-phenylindole, 1-ethyl-2-phenylindole, 1,2-dimethylindole, 2-methyl-5-methoxyindole, 2-phenyl-5-chloroindole and 1,2,5-trimethylindole.

Suitable indoline derivatives having the formula (25) include 2-methylindoline, 2-ethylindoline, and 2,3,3-trimethylindoline, etc.

Suitable aniline derivatives having the formula (26) include aniline, p-anisidine, 2-chloro-4-ethylaniline, 2,4-dimethoxyaniline, o-phenetidine, 4-n-propylaniline, cresidine, 4-amino-N-ethylaniline, 4-amino-dimethylaniline, 4-amino-N-ethyl-N-β-hydroxyethylaniline, 4-amino-3-methyl-diethylaniline, 4-amino-N-methyl-N-β-cyanoethylaniline, 4-amino-3-methoxy-diethylaniline, 4-amino-N-ethyl-N-benzylaniline, 4-amino-diphenylamine, 4-amino-N-methyl-diphenylamine, 4-amino-N-ethyl-N-β-methoxyethylaniline and 4-aminobenzylaniline, etc.
Suitable heterocyclic compounds having the formulae (27), (28), (29), (30) and (31) used in the second method include the compounds having the following formula
Formula 27
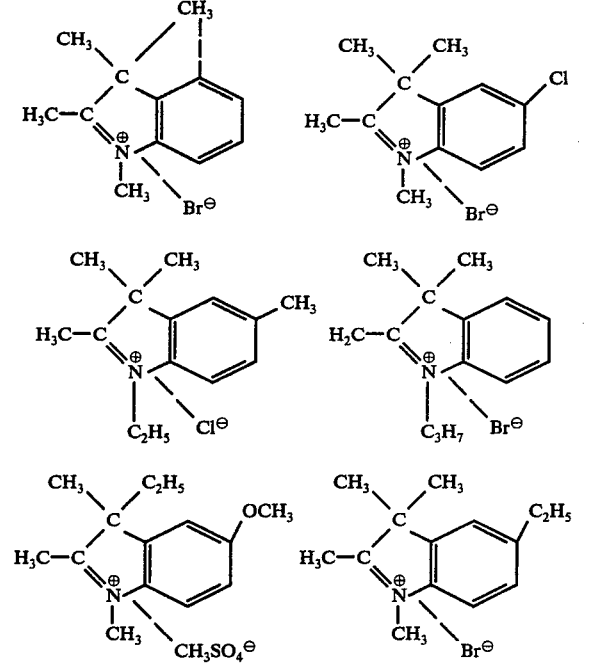
Formula 28
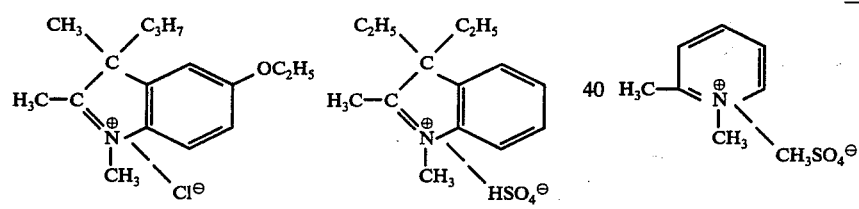
Formula 29
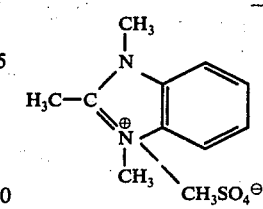
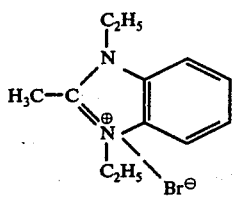
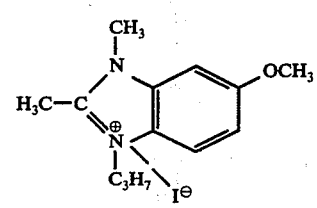
Formula 30
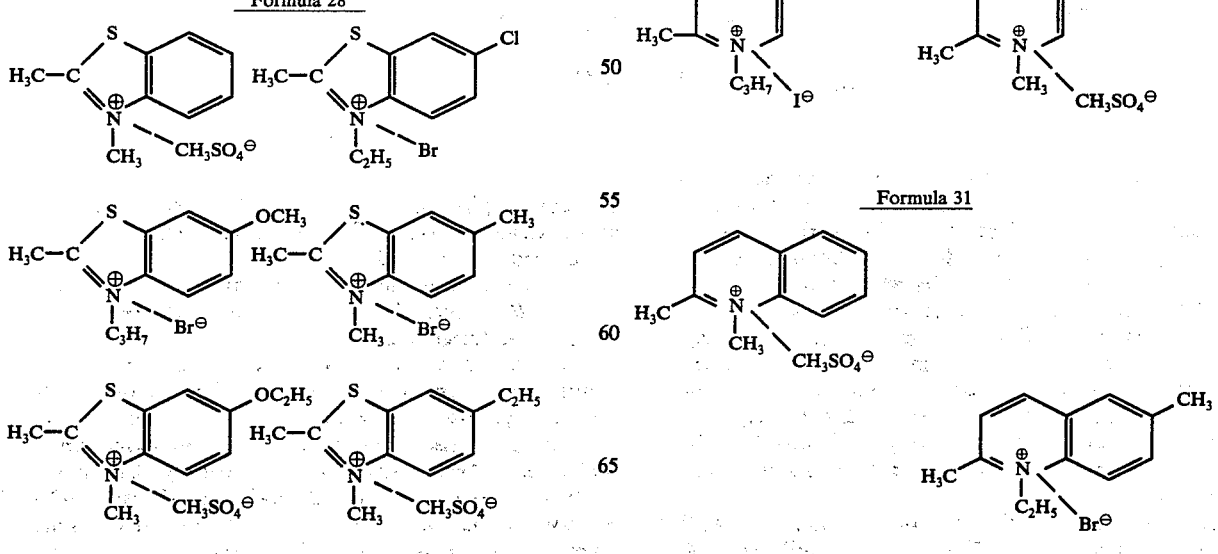
Formula 31
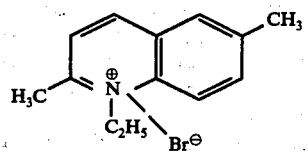

-continued
Formula 31

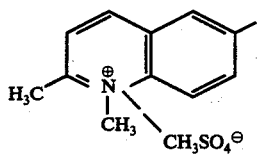

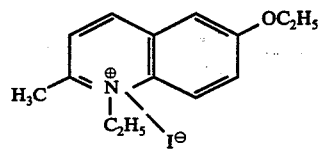

The acidic modified synthetic fibers on which the cation dyes are formed by the quaternization in the heat transfer printing of the invention include acidic modified acryl type fibers having 10 to 200 m mole/kg preferably 10 to 100 m mole/kg especially 20 to 70 m mole/kg sulfonic acid group which is introduced in the production of the fiber or polymer, and acidic modified polyester type fibers having 10 to 200 m mole/kg preferably 30 to 200 m mole/kg especially 80 to 150 m mole/kg of sulfonic acid group which is introduced in the production of the fiber or polymer, and acidic modified polyamide type fibers having 10 to 200 m mole/kg preferably 20 to 100 m mole/kg especially 50 to 90 m mole/kg of sulfonic acid group which is introduced in the production of the fiber or polymer.

The acidic modified synthetic fibers are preferably acidic modified acrylic synthetic fibers, polyamide fibers and polyester fibers which have sulfonic acid groups in the molecule.

The acidic modified acrylic synthetic fibers can be produced by copolymerizing an acrylic monomer with an unsaturated monomer having sulfonic acid group such as allylsulfonic acid, metha-allylsulfonic acid, allyloxyethylsulfonic acid, metha-allyloxyethylsulfonic acid, allyloxypropanolsulfonic acid, allylthioethylsulfonic acid, allylthiopropanolsulfonic acid, isopropenylbenzenesulfonic acid, vinylbromobenzenesulfonic acid, vinylfluorobenzenesulfonic acid, vinylmethylbenzenesulfonic acid, styresesulfonic acid or a water soluble salts thereof.

Styrenesulfonic acid is preferably used in the copolymerization. The sulfonic acid group can be also incorporated by using an oxidizing agent such as persulfates e.g. sodium persulfate, potassium persulfate, or a reducing agent such as thiosulfates and bisulfites such as sodium methabisulfite or potassium metha-bisulfite in the polymerization.

The acidic modified polyamide fibers can be produced by adding a modifier having a sulfonic acid group or a salt thereof such as 4,4'-diamino-3,3'-sodium sulfodiphenyl alkane, 4,4'-diaminostilbene-2,2'-disulfonic acid, N-(sulfoalkyl)-alkylenediamine, 2,4-diphenoxy-6-(p-sodium sulfo) Phenylamino-S-triazine, especially potassium 3,5-dicarboxybenzenesulfonate in the polymerization.

The acidic modified polyamide fibers can be also obtained by adding a modifier having a sulfonic acid group or a salt thereof such as the above-mentioned modifier or sulfonated polystyrene in a surface modification or in a melt-spinning.

The acidic modified polyesters can be produced by adding a modifier having a sulfonic acid group or a salt thereof such as metal 3,5-di-(carbo-alkoxy) benzenesulfonates, metal p-hydroxyethoxy-benzene-sulfonate, metal 2,5-bis(hydroxyethoxy) benzenesulfonate, metal 2-carbo-p-hydroxyethoxy-5-hydroxyethoxy-benzene-sulfonate, $(HOOC)_2$—$\phi PO_3Na$, $(HOOC)_2$—$\phi$—$O$—$(CH_2)_n$—$O$—$\phi$—$SO_3Na$, $HO$—$\phi$—$SO_3Na$, $HOH_2CH_2C$—$(OCH_2$—$CH_2)_n$—$O$—$\phi$—$SO_3Na$, $HOOC$—$\phi$—$PO$—$\phi$—$COOH$, or $CH_2 = CH$—$\phi$—$SO_3Na$ especially sulfoisophthalate ($\phi$ : benzene ring n = 2, 3 or 4) in a polycondensation or in a melt-spinning.

It is possible to apply the transfer printing of the invention to the mixed spun fibers mixed fiber woven and knitted fabric which include the acidic modified synthetic fibers.

The transfer paper used in the invention can be prepared by producing an aqueous or oily coloring composition (ink or printing paste) by the conventional process and applying coloring composition on a substrate sheet such as paper or film in suitable pattern, or all surface, by suitable printing method, textile printing method, hand writing method, dipping method or spraying method.

In order to prepare suitable transfer printed textiles, the transfer paper is superposed to a textile under heating. The transfer condition is preferably in a range of 120° to 210° C in an atmospheric pressure or a reduced pressure for 20 seconds to 5 minutes in heating step.

The colored textiles obtained by the process of the invention usually have characteristics for using them without further treatment.

Thus, if necessary, the characteristics can be improved by a steaming process to obtain colored textiles having excellent fastnesses.

The transfer printability of the indolenine methine compound in the transfer printing condition is excellent so as to obtain colored textiles having deep hue. The colored textiles have excellent fastnesses such as cleaning fastness, because the indolenine methine compound is fixed by ionic bonding, the tertiary nitrogen atom of the indolenine methine compound with the acidic groups of the acidic modified synthetic fiber as illustrated. The mechanism is quite different from that of the disperse dyes in polyester fibers.

The transfer printing velocity of the indolenine methine compound has low temperature dependency and accordingly, it is not so highly affected by non-uniformity of temperature and uniformly colored products can be obtained.

The invention will be further illustrated by certain examples wherein terms of percent and part means percent and part by weight unless otherwise specified.

EXAMPLES 1 TO 8

| | |
|---|---|
| Ethyl cellulose (N-7 manufactured by Hercules Co.) | 9 parts |
| Clay | 5 parts |
| Xylene | 60 parts |
| Ethyleneglycol monoethyl ether | 16 parts |
| Compound shown in Table 1 | 10 parts |
| Total | 100 parts |

The components were uniformly dispersed by a ball mill to prepare gravure inks. Transfer papers were prepared by printing each gravure ink on wood free paper by a gravure printing.

Each transfer paper was superposed on an acidic modified acryl textile (having 50 m mole/kg of sulfonic acid group) and they were inserted into a heating apparatus (A-Jaxes manufactured by American laundry machinery Co.) and were heated at 190° C in an atmospheric pressure for 30 seconds to prepare the colored textile.

The hues of the colored textiles were excellent and the light-fastnesses and wet-fastnesses of the colored textiles were remarkably high.

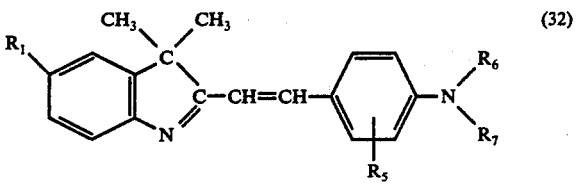
(32)

Table 1

| Example | Compound | Hue |
|---|---|---|
| 1 | | red |
| 2 | | yellowish red |
| 3 | | red |
| 4 | | red |
| 5 | | red |
| 6 | | red |
| 7 | | red |
| 8 | | red |

EXAMPLES 9 TO 16

The heat transfer printing of Example 1 was repeated except using the compounds having the formula The transfer printed textiles having excellent similar characteristics have been obtained.

The substituents of the compounds are shown in Table 2 for identifying the compounds. The hues of the acidic modified acrylonitrile fiber textiles are shown in Table 2.

Table 2

| Example | $R_1$ | $R_6$ | $R_7$ | $R_5$ | Hue |
|---|---|---|---|---|---|
| 9 | —H | —CH$_3$ | —CH$_2$CH$_2$OCH$_3$ | —H | red |
| 10 | —H | —C$_2$H$_5$ | —CH$_2$CH$_2$Cl | —CH$_3$ | red |
| 11 | —H | —CH$_3$ | 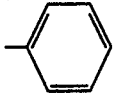 | —H | bluish red |
| 12 | —CH$_3$ | —CH$_2$CH$_3$ | —CH$_2$CH$_3$ | —H | red |
| 13 | —CH$_3$ | —CH$_2$CH$_3$ | —CH$_2$CH$_3$ | —Cl | red |
| 14 | —OCH$_3$ | —CH$_3$ | 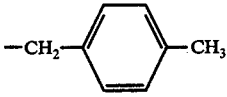 | —H | yellowish red |
| 15 | —OCH$_3$ | —CH$_3$ | —CH$_2$CH$_2$CN | —CH$_3$ | yellowish red |
| 16 | —Cl | —CH$_2$CH$_2$CN | 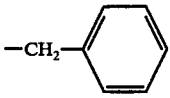 | —H | red |

EXAMPLE 17

| | |
|---|---|
| Solution of water soluble acryl resin in water and isopropyl alcohol (1 : 1) (solid component 45%) | 40 parts |
| Water | 30 parts |
| Isopropyl alcohol | 20 parts |
| Compound of Example 1 | 10 parts |
| Total | 100 parts |

The components were dispersed in a sand mill to prepare an aqueous gravure ink. A transfer paper was prepared by printing the gravure ink on wood free paper by a gravure printing.

Each transfer paper was superposed on an acidic modified polyamide textile (having 65 m mole/kg of sulfonic acid group) and they were heated at 190° C in an atmospheric pressure for 30 seconds to prepare the colored textile having excellent characteristics as those of Example 1.

EXAMPLE 18

| | |
|---|---|
| Ethyl cellulose (N-100 manufactured by Hercules Co.) | 6.5 parts |
| Clay | 8.0 parts |
| Ethyleneglycol monobutyl ether | 80.5 parts |
| Compound of Example 2 | 5.0 parts |
| Total | 100 parts |

The components were dispersed by a three roller mill to prepare a silk screen ink.

A transfer paper was prepared by a screen printing with the silk screen ink on wood free paper.

The transfer paper was superposed on polyethyleneterephthalate textile (having 110 m mole of sulfonic acid group) and they were inserted into a heating apparatus (A-Jaxes) and were heated at 190° C in an atmospheric pressure for 30 seconds to prepare the colored textile having excellent characteristics as those of Example 1.

EXAMPLES 19 TO 26

| | |
|---|---|
| Ethyl cellulose (N-7 manufactured by Hercules Co.) | 9 parts |
| Clay | 5 parts |
| Xylene | 60 parts |
| Ethyleneglycol monoethyl ether | 16 parts |
| Compound shown in Table 3 | 10 parts |
| Total | 100 parts |

The components were uniformly dispersed by a ball mill to prepare each gravure ink. Transfer papers were prepared by printing each gravure ink on wood free paper by a gravure printing.

Each transfer paper was superposed on an acidic modified acryl textile (having 50 m mole/kg of sulfonic acid group) and they were inserted into a heating apparatus (A-Jaxes manufactured by American laundry machinery Co.) and were heated at 190° C in an atmospheric pressure for 30 seconds to prepare the colored textile.

The hues of the colored textiles were excellent and the light-fastnesses and wet-fastnesses of the colored textiles were remarkably high.

Table 3

| Ex. | Compound | Hue |
|---|---|---|
| 19 | 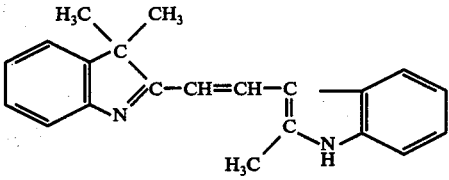 | orange |

Table 3-continued

| Ex. | Compound | Hue |
|---|---|---|
| 20 | (structure) | orange |
| 21 | (structure) | orange |
| 22 | (structure) | orange |
| 23 | (structure) | yellowish orange |
| 24 | (structure) | yellow |
| 25 | (structure) | yellow |
| 26 | (structure) | orange |

EXAMPLES 27 TO 34

The heat transfer printing of Example 19 was repeated except using the compound having the formula

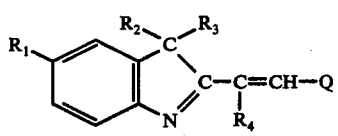

(1)

shown in Table.

The transfer printed textiles having excellent similar characteristics have been obtained.

The substituents of the compounds are shown in Table 4 for identifying the compounds. The hues of the acidic modified acrylonitrile fiber textiles are shown in Table 4.

Table 4

| Example | R₁ | R₂ | R₃ | R₄ | Q | Hue |
|---|---|---|---|---|---|---|
| 27 | —H | —CH₃ | —CH₃ | —H | =C(C₆H₅)–C(=N(C₂H₅)(C₆H₄-)) | orange |
| 28 | —H | —CH₃ | —CH₃ | —H | =C(C₂H₅)–C(=N–H)(4-CH₃-C₆H₃–) | orange |
| 29 | —CH₃ | —CH₃ | —CH₃ | —H | =C(CH₃)–C(=N–H)(4-OCH₃-C₆H₃–) | orange |
| 30 | —C₂H₅ | —CH₃ | —CH₃ | —H | =C(C₆H₅)–C(=N–H)(5-Cl-C₆H₃–) | orange |
| 31 | —OC₂H₅ | —CH₃ | —CH₃ | —H | —N(CH(C₂H₅)CH₂—)(o-tolyl) | yellow |
| 32 | —Br | —CH₃ | —CH₃ | —H | —N(CH(CH₃)C(CH₃)₂—)(o-tolyl) | yellow |
| 33 | —H | —CH₃ | —CH₃ | —CH₃ | 2,4-di(CH₃)-C₆H₃– | yellow |
| 34 | —H | —CH₃ | —CH₃ | —CN | 4-OCH₃-C₆H₄– | yellow |

EXAMPLE 35

| | |
|---|---|
| Solution of water soluble acryl resin in water and isopropyl alcohol (1 : 1) (solid component 45%) | 40 parts |
| Water | 30 parts |
| Isopropyl alcohol | 20 parts |
| Compound of Example 1 | 10 parts |
| Total | 100 parts |

The components were dispersed in a sand mill to prepare an aqueous gravure ink.

A transfer paper was prepared by printing the gravure ink on wood free paper by a gravure printing.

Each transfer paper was superposed on an acidic modified polyamide textile (having 65 m mole/kg of sulfonic acid group) and they were heated at 190° C in an atmospheric pressure for 30 seconds to prepare the colored textile having excellent characteristics as those of Example 19.

EXAMPLE 36

| | |
|---|---|
| Ethyl cellulose (N-100 manufactured by Hercules Co.) | 6.5 parts |
| Clay | 8.0 parts |
| Ethyleneglycol monobutyl ether | 80.5 parts |
| Compound of Example 27 | 5.0 parts |
| Total | 100 parts |

The components were dispersed by a three roller mill to prepare a silk screen ink.

A transfer paper was prepared by a screen printing with the silk screen ink on wood free paper.

The transfer paper was superposed on polyethyleneterephthalate textile (having 110 m mole/kg of sulfonic acid group) and they were inserted into a heating apparatus (A-Jaxes) and were heated at 190° C in an atmospheric pressure for 30 seconds to prepare the colored textile having excellent characteristics as those of Example 27.

Each transfer paper was superposed on an acidic modified acryl textile (having 50 m mole/kg of sulfonic acid group) and they were inserted into a heating apparatus. (A-Jaxes manufactured by American laundry machinery Co.) and were heated at 190° C in an atmospheric pressure for 30 seconds to prepare the colored textile.

The hues of the colored textiles were excellent and the light-fastnesses and wet-fastnesses of the colored textiles were remarkably high Table 5

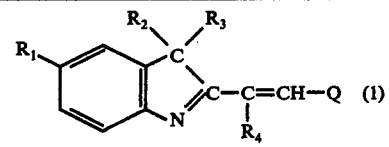

| Example | $R_1$ | $R_2$ | $R_3$ | $R_4$ | Q | Hue |
|---|---|---|---|---|---|---|
| 37 | —H | —$CH_3$ | —$CH_3$ | —H | —NH—C$_6$H$_4$—OCH$_3$ | yellow |
| 38 | — | —$CH_3$ | —$CH_3$ | —H | —NH—C$_6$H$_4$—NH—C$_6$H$_5$ | yellow |
| 39 | —$OCH_3$ | —$CH_3$ | —$CH_3$ | —H | —NH—C$_6$H$_4$—N($C_2H_5$)$_2$ | orange |
| 40 | —Cl | —$CH_3$ | —$CH_3$ | —H | —NH—C$_6$H$_3$(CH$_3$)—N($C_2H_5$)$_2$ | orange |
| 41 | —H | —$CH_3$ | —$C_2H_5$ | —H | —NH—C$_6$H$_4$—N($C_2H_5$)($C_2H_4OCH_3$) | orange |
| 42 | —H | —$C_2H_5$ | —$C_2H_5$ | —H | —NH—C$_6$H$_4$—N(H)(CH$_2$—C$_6$H$_5$) | orange |
| 43 | —H | —$CH_3$ | —$CH_3$ | —$CH_3$ | —NH—C$_6$H$_3$(OCH$_3$)—OCH$_3$ | yellow |
| 44 | —H | —$CH_3$ | —$CH_3$ | —CN | —NH—C$_6$H$_3$(OCH$_3$)—CH$_3$ | yellow |

EXAMPLES 37 TO 44

| | |
|---|---|
| Ethyl cellulose (N-7 manufactured by Hercules Co.) | 9 parts |
| Clay | 5 parts |
| Xylene | 60 parts |
| Ethyleneglycol monoethyl ether | 16 parts |
| Compound of Table 5 | 10 parts |
| Total | 100 parts |

The components were uniformly dispersed by a ball mill to prepare gravure inks.

Transfer papers were prepared by printing each gravure ink on wood free paper by a gravure printing.

EXAMPLES 45 TO 52

The heat transfer printing of Example 37 was repeated except using the compound having the formula

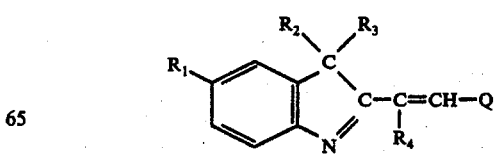

shown in Table 6.

Table 6

| Example | R₁ | R₂ | R₃ | R₄ | Q | Hue |
|---------|-----|-----|-----|-----|---|-----|
| 45 | —H | —CH₃ | —CH₃ | —H | 1,3,3-trimethyl-2-methyleneindoline (=CH—) | red |
| 46 | —CH₃ | —CH₃ | —CH₃ | —H | 5-chloro-1,3,3-trimethyl-2-methyleneindoline (=CH—) | red |
| 47 | —OC₂H₅ | —CH₃ | —CH₃ | —H | 6-methoxy-3-methyl-2-methylenebenzothiazoline (=CH—) | red |
| 48 | —Br | —CH₃ | —CH₃ | —H | 1,3-dimethyl-2-methylenebenzimidazoline (=CH—) | red |
| 49 | —H | —C₂H₅ | —C₂H₅ | —H | 1-methyl-2-methylene-1,2-dihydropyridine (=CH—) | red |
| 50 | —OCH₃ | —CH₃ | —CH₃ | —H | 1-methyl-2-methylene-1,2-dihydroquinoline (=CH—) | red |
| 51 | —H | —CH₃ | —CH₃ | —CH₃ | 3,3-diethyl-1-methyl-2-methyleneindoline (=CH—) | red |
| 52 | —H | —CH₃ | —CH₃ | —CN | 1,3,3-trimethyl-2-methyleneindoline (=CH—) | red |

EXAMPLE 53

| | |
|---|---|
| Solution of water soluble acryl resin in water and isopropyl alcohol (1 : 1) | 40 parts |
| Water | 30 parts |
| Isopropyl alcohol | 20 parts |
| Compound of Example 37 | 10 parts |
| Total | 100 parts |

The components were dispersed in a sand mill to prepare an aqueous gravure ink.

A transfer paper was prepared by printing the gravure ink on wood free paper by a gravure printing.

Each transfer paper was superposed on an acidic modified polyamide textile (having 65 m mole/kg of sulfonic acid group) and they were heated at 190°C in an atmospheric pressure for 30 seconds to prepare the colored textile having excellent characteristics as those of Example 37.

EXAMPLE 54

| | |
|---|---|
| Ethyl cellulose (N-100 manufactured by Hercules Co.) | 6.5 parts |
| Clay | 8.0 parts |
| Ethyleneglycol monobutyl ether | 80.5 parts |
| Compound of Example 45 | 5.0 parts |
| Total | 100 parts |

The components were dispersed by a three roller mill to prepare a silk screen ink.

A transfer paper was prepared by a screen printing with the silk screen ink on wood free paper.

The transfer paper was superposed on polyethyleneterephthalate textile (having 110 m mole/kg of sulfonic acid group) and they were inserted into a heating apparatus (A-Jaxes) and were heated at 190° C in an atmospheric pressure for 30 seconds to prepare the colored textile having excellent characteristics as those of Example 45.

What is claimed is:

1. A heat transfer printing which comprises quaternizing an indolenine methine compound on an acidic modified synthetic fiber to form the corresponding cationic indolenine methine dye with the acidic groups of said acidic modified synthetic fiber.

2. A heat transfer printing according to claim 1, wherein said indolenine methine compound is selected from the compounds having the formula (1)

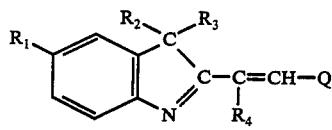     (1)

wherein $R_1$ represents hydrogen atom, a halogen atom, a $C_1 - C_3$ lower alkyl group or a $C_1 - C_3$ lower akoxy group; $R_2$ and $R_3$ are the same or different and respectively represents a $C_1 - C_3$ lower alkyl group; $R_4$ represents hydrogen atom; methyl or cyano group; and Q represents the formula (2);

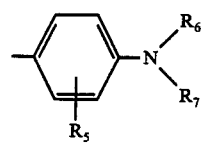     (2)

wherein $R_5$ represents hydrogen atom, a halogen atom, a $C_1 - C_3$ lower alkyl group or a $C_1 - C_3$ lower alkoxy group; $R_6$ and $R_7$ respectively represent a $C_1 - C_4$ lower alkyl group including substituted alkyl groups having non-dissociated substituent), a phenyl or aralkyl group; or the formula (3), (4) or (5);

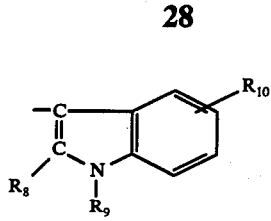     (3)

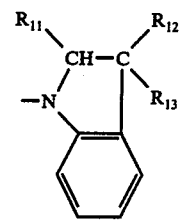     (4)

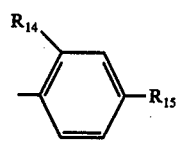     (5)

wherein $R_8$ represents $C_1 - C_3$ lower alkyl group or phenyl group; $R_9$ represents hydrogen atom or a $C_1 - C_3$ lower alkyl group; $R_{10}$ represents hydrogen atom or non-dissociated substituent; $R_{11}$, $R_{12}$ and $R_{13}$ respectively represent hydrogen atom or a $C_1 - C_3$ lower alkyl group; $R_{14}$ and $R_{15}$ respectively represent hydrogen atom or a $C_1 - C_3$ lower alkyl group or a $C_1 - C_3$ lower alkoxy group or the formula (6);

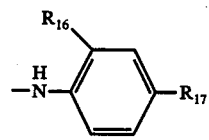     (6)

wherein $R_{16}$ represents hydrogen atom, a halogen atom, a $C_1 - C_3$ lower alkyl group or a $C_1 - C_3$ lower alkoxy group; $R_{17}$ represents hydrogen atom, a $C_1 - C_3$ lower alkyl group, a $C_1 - C_3$ lower alkoxy group; or the formula (7);

     (7)

wherein $R_{18}$ represents hydrogen atom, a $C_1 - C_3$ lower alkyl group (including substituted alkyl group having non-dissociated substituent;) $R_{19}$ represents a $C_1 - C_3$ lower alkyl group (including alkyl group having non-dissociated substituent); phenyl or aralkyl group; or the formulae (8), (9), (10), (11), or (12);

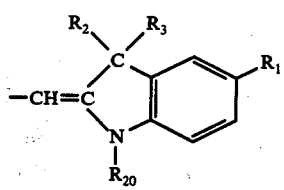     (8)

-continued

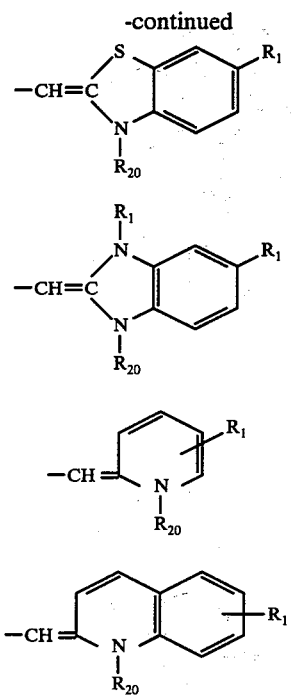

wherein $R_{20}$ and $R_{21}$ respectively represents a $C_1 - C_3$ lower alkyl group; $R_1$, $R_2$ and $R_3$ are defined above.

3. A heat transfer printing according to claim 1, wherein said indolenine methine compound is mixed in a transfer printing ink and the transfer printing ink is printed on a transfer paper or film and then the transfer paper and film is superposed on an acid modified synthetic fiber textile to heat them to react said indolenine methine compound with the acidic groups of said acidic modified synthetic fiber.

4. A heat transfer printing according to claim 1, wherein said indolenine methine is selected from the compounds having the formula

[Formula (1): benzofused ring with $R_1$, $R_2$, $R_3$, $R_4$, substituents, $C-C=CH-Q$]

wherein $R_1$ represents hydrogen atom, a halogen atom, a $C_1 - C_3$ lower alkyl group or a $C_1 - C_3$ lower alkoxy group; $R_2$ and $R_3$ are the same or different and respectively represents a $C_1 - C_3$ lower alkyl group; $R_4$ represents hydrogen atom; methyl or cyano group; and Q represents the formula (2);

[Formula (2): phenyl ring with $R_5$, and $N(R_6)(R_7)$ substituent]

wherein $R_5$ represents a hydrogen atom, a halogen atom, a $C_1 - C_3$ lower alkyl group or a $C_1 - C_3$ lower alkoxy group; $R_6$ and $R_7$ respectively represent a $C_1 - C_4$ lower alkyl group (including substituted alkyl groups having non-dissociated substituent), a phenyl or aralkyl group;

[Formula (3): indole ring with $R_{10}$, $R_8$, $R_9$ substituents]

[Formula (4): indoline-like ring with $R_{11}$, $R_{12}$, $R_{13}$ substituents, CH—C linkage]

[Formula (5): phenyl ring with $R_{14}$ and $R_{15}$ substituents]

wherein $R_8$ represents a $C_1 - C_3$ lower alkyl group or phenyl group; $R_9$ represents hydrogen atom or a $C_1 - C_3$ lower alkyl group; $R_{10}$ represents hydrogen atom or non-dissociated substituent; $R_{11}$, $R_{12}$ and $R_{13}$ respectively represent hydrogen atom or a $C_1 - C_3$ lower alkyl group; $R_{14}$ and $R_{15}$ respectively represent hydrogen atom or a $C_1 - C_3$ lower alkyl group or a $C_1 - C_3$ lower alkoxy group.

5. A heat transfer printing according to claim 1, wherein said indolenine methine is selected from the compounds having the formula

[Formula (1): benzofused ring with $R_1$, $R_2$, $R_3$, $R_4$, $C-C=CH-Q$]

wherein $R_1$ represents hydrogen atom, a halogen atom, a $C_1 - C_3$ lower alkyl group or a $C_1 - C_3$ lower alkoxy group; $R_2$ and $R_3$ are the same or different and respectively represents a $C_1 - C_3$ lower alkyl group; $R_4$ represents hydrogen atom; methyl or cyano group; and Q represents the formulae (3), (4) or (5).

6. A heat transfer printing according to claim 1, wherein said indolenine methine is selected from the compounds having the formula

[Formula (1): benzofused ring with $R_1$, $R_2$, $R_3$, $R_4$, $C-C=CH-Q$]

wherein $R_1$ represents hydrogen atom, a halogen atom, a $C_1 - C_3$ lower alkyl group or a $C_1 - C_3$ lower alkoxy group; $R_2$ and $R_3$ are the same or different and respectively represents a $C_1 - C_3$ lower alkyl group; $R_4$ represents hydrogen atom; methyl or cyano group; and Q represents the formula (6);

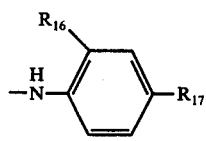

(6)

wherein $R_{16}$ represents hydrogen atom, a halogen atom, a $C_1 - C_3$ lower alkyl group or a $C_1 - C_3$ lower alkoxy group, $R_{17}$ represents hydrogen atom, a $C_1 - C_3$ lower alkyl group, a $C_1 - C_3$ lower alkoxy group; or the formula (7);

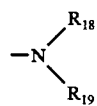

(7)

wherein $R_{18}$ represents hydrogen atom, a $C_1 - C_3$ lower alkyl group (including substituted alkyl group having non-dissociated substituent;) $R_{19}$ represents a $C_1 - C_3$ lower alkyl group (including alkyl group having non-dissociated substituent); phenyl or aralkyl group; or the formulae (8), (9), (10), (11), or (12)

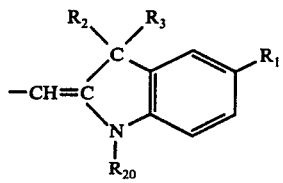

(8)

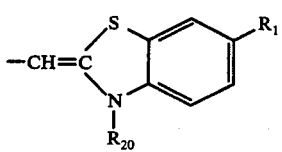

(9)

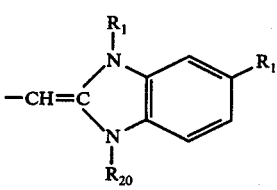

(10)

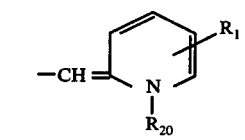

(11)

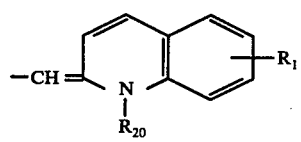

(12)

wherein $R_{20}$ and $R_{21}$ respectively represents a $C_1 - C_3$ lower alkyl group; $R_1$, $R_2$, and $R_3$ are defined above.

* * * * *